(12) United States Patent
Loszewski

(10) Patent No.: US 7,168,534 B2
(45) Date of Patent: Jan. 30, 2007

(54) CLUTCH OR BRAKE DEVICE FORMED OF COMPOSITE FOAM

(75) Inventor: Raymond C. Loszewski, Windham, NH (US)

(73) Assignee: Messier-Bugatti S.A., Velizy (FR)

( * ) Notice: Subject to any disclaimer, the term of this patent is extended or adjusted under 35 U.S.C. 154(b) by 205 days.

(21) Appl. No.: 11/029,114

(22) Filed: Dec. 31, 2004

(65) Prior Publication Data

US 2005/0115791 A1 Jun. 2, 2005

Related U.S. Application Data

(62) Division of application No. 10/675,295, filed on Sep. 30, 2003, now Pat. No. 6,858,302, which is a division of application No. 09/857,949, filed as application No. PCT/US99/30140 on Dec. 17, 1999, now Pat. No. 6,726,962.

(60) Provisional application No. 60/112,704, filed on Dec. 18, 1998.

(51) Int. Cl.
*F16D 9/02* (2006.01)
(52) U.S. Cl. ............... 188/251 A; 188/250 R
(58) Field of Classification Search ............ 188/251 A, 188/250 R; 428/408
See application file for complete search history.

(56) References Cited

U.S. PATENT DOCUMENTS

| | | | |
|---|---|---|---|
| 3,109,712 A | 11/1963 | Redforn | |
| 4,442,165 A | 4/1984 | Gebhardt et al. | 428/307.7 |
| 4,472,454 A | 9/1984 | Houdayer et al. | |
| 4,700,823 A | 10/1987 | Winckler | |
| 4,892,783 A | 1/1990 | Brazel | 428/408 |
| 5,154,970 A | 10/1992 | Kaplan et al. | |
| 5,348,774 A | 9/1994 | Golecki et al. | |
| 5,372,380 A | 12/1994 | Duffy et al. | |
| 5,389,152 A | 2/1995 | Thurston et al. | |
| 5,397,595 A | 3/1995 | Carroll et al. | |
| 5,540,996 A | 7/1996 | Tanzilli et al. | 428/408 |
| 5,547,717 A | 8/1996 | Scaringella et al. | |
| 5,643,663 A | 7/1997 | Bommier et al. | |

(Continued)

FOREIGN PATENT DOCUMENTS

| | | |
|---|---|---|
| WO | WO 98/27023 | 6/1998 |
| WO | WO 99/40043 | 8/1999 |

OTHER PUBLICATIONS

Sherman, A.J. et al., "Refractory Ceramic Foams: A Novel, New High-Temperature Structure," 70 Ceramic Bulletin 1025-28 (1991).

(Continued)

*Primary Examiner*—Archene Turner
(74) *Attorney, Agent, or Firm*—Weingarten, Schurgin, Gagnebin & Lebovici LLP

(57) ABSTRACT

An improved clutch or brake device in which at least two members are mounted for relative rotation and engagement, the members having friction material rotatable therewith, and the friction material of the members having surfaces confronting each other, characterized in that the friction material has a solid density of greater than 30% and includes an open lattice of carbon ligaments forming a network of three dimensionally interconnected cells; and a pyrolytic carbon coating on the open lattice of carbon ligaments.

4 Claims, 1 Drawing Sheet

U.S. PATENT DOCUMENTS

| | | |
|---|---|---|
| 5,662,993 A | 9/1997 | Winckler |
| 5,733,611 A | 3/1998 | Thurston et al. |
| 5,981,002 A | 11/1999 | Connors, Jr. |
| 6,037,032 A | 3/2000 | Klett et al. |
| 6,077,464 A | 6/2000 | Murdie et al. |
| 6,315,974 B1 | 11/2001 | Murdie et al. |
| 6,323,160 B1 | 11/2001 | Murdie et al. |

OTHER PUBLICATIONS

Ultramet, "ULTRAFOAM Open-Cell Carbon Foam," brochure (1992).

Ultramet, "ULTRACAT Catalyst Substrate" brochure. No date available.

Vitre-Cell, Inc., "Reticulated Vitreous Carbon (RVC)" brochure. No date available.

CLUTCH OR BRAKE DEVICE FORMED OF COMPOSITE FOAM

RELATED APPLICATIONS

This application is a divisional application of U.S. application Ser. No. 10/675,295 filed Sep. 30, 2003 now U.S. Pat. No. 6,858,302; which is a divisional of U.S. application Ser. No. 09/857,949 filed Aug. 8, 2001, now U.S. Pat. No. 6,726,962 issued Apr. 27, 2004; which is the 371 national phase of PCT/US99/30140 filed Dec. 17, 1999; and claims the benefit of U.S. Provisional Application No. 60/112,704 filed Dec. 18, 1998, the entire contents of which are incorporated herein by reference.

BACKGROUND OF THE INVENTION

Relatively-dense carbon/carbon composites have been found to be highly useful in a variety of structural applications. Because of certain characteristics, such as high strength, high stiffness, light weight, high temperature resistance, and advantageous frictional properties, these composites are desirably suited for use, for example, in the aerospace and automotive brake pad industries. They are favored for use in high-end automotive transmissions but high costs have prevented widespread utilization.

Dense carbon/carbon composite-structures typically include a carbon fiber matrix, wherein the interstices in the fiber matrix are at least partially filled with deposited carbon. The carbon fibers are high in strength, and are typically in the form of a woven or nonwoven fabric or mat. In either case, the carbon fibers provide the composite with structural reinforcement.

To fill the carbon fabric with additional carbon, the fibers are typically placed in a chamber, where they are heated and exposed to a carbon-based vapor. Carbon from the vapor is thereby deposited on the heated fabric via chemical vapor deposition.

In an alternative method for depositing carbon, the fiber fabric is placed in a chamber filled with liquid precursor (cyclohexane, for example), and the fibers are heated to pyrolize the liquid precursor at the surface of the fabric. The pyrolysis of the precursor produces a vapor that deposits carbon on the fibers within the fabric. This process is referred to as "rapid densification" and is described in greater detail in U.S. Pat. No. 5,389,152, issued to Thurston et al.

Though the above-described methods are known to produce high-quality composite structures, the commercial application of these structures is limited by the high cost of carbon fibers, processing and energy consumption. Accordingly, the application of these methods to mass-production industries such as automobile manufacturing has thus far been greatly limited due to economic feasibility. Further, due to the axially-elongated structure of the fibers, the composite properties are generally non-isotropic and highly dependent on fiber orientation.

SUMMARY OF THE INVENTION

The invention is generally directed to a method of forming a composite foam, the composite foam, and articles, such as clutch and brake components, formed of the composite foam.

In methods of this invention, a composite foam is formed by depositing one or several layers of a coating on an open-cell foam reticulated skeleton. The coatings may be metallic, ceramic, carbonaceous etc.

In accordance with one aspect of a method of the invention, the reticulated foam skeleton is contacted with a liquid precursor. The reticulated foam skeleton is heated to pyrolize the liquid precursor and cause a product of the pyrolized liquid precursor to deposit on the reticulated foam skeleton, thereby forming a composite foam of a higher density than the starting material. The sequence of material types that constitute the various layers may be varied.

In accordance with another aspect of a method of the invention, a reticulated carbon skeleton is formed by pyrolizing a polymeric foam. Carbon then is deposited on the carbon skeleton to form a carbon/carbon composite foam with a solid density of greater than 30%.

A carbon foam of this invention, which can be formed by the above-described methods, includes an open lattice of carbon ligaments that form a network of three-dimensionally interconnected cells and a pyrolytic carbon coating on the open lattice. The solid density of the carbon foam is greater than 30%.

Articles formed of the carbon foam include a clutch or brake device with a pair of members mounted for relative rotation and engagement. The carbon foam serves as a friction material that is rotatable with the members and includes confronting surfaces.

The methods and apparatus of this invention provide numerous advantages. For example, the cost of carbon foam is generally lower than that of carbon fibers. Therefore, methods of this invention can significantly reduce the cost of forming substantially-dense carbon/carbon composite foams. Accordingly, a broader range of applications can now be economically justified for use of carbon/carbon composites. Further, the resulting foams can have a substantially isotropic and openly-porous structure relative to that of many materials that employ fibers. Because the composite is substantially isotropic, performance of a frictional surface comprising a foam of this invention is likely to be more uniform and consistent as the friction surface wears. The ceramic composite foams also have a relatively high permeability, thereby facilitating hydraulic flow in many wet-friction applications. Moreover, distortion from machining is reduced due to the isotropic structure, thereby promoting flatness and parallelism in machined friction surfaces. The methods of this invention also can be used to produce exceptionally dense structures with over 50% solid density, while retaining open porosity.

Though a carbon skeleton generally has low strength relative to carbon fibers, the matrix that is deposited imparts sufficient structural integrity where the open porosity and isotropy of the carbon skeleton offer an excellent structure for wet frictional applications. The distribution of pores therethrough is substantially uniform and provide an interlaced network of conduits through which hydraulic fluid can flow. Further, the nature of this structure also enables extremely high densification levels (e.g., up to 90%), while retaining interconnected pores throughout the structure. The lack of strength in the carbon skeleton is made up for by the pyrolytic carbon or other deposit which provides the foam with the structural reinforcement that is needed for applications such as wet friction.

DETAILED DESCRIPTION OF THE INVENTION

Figure 1:
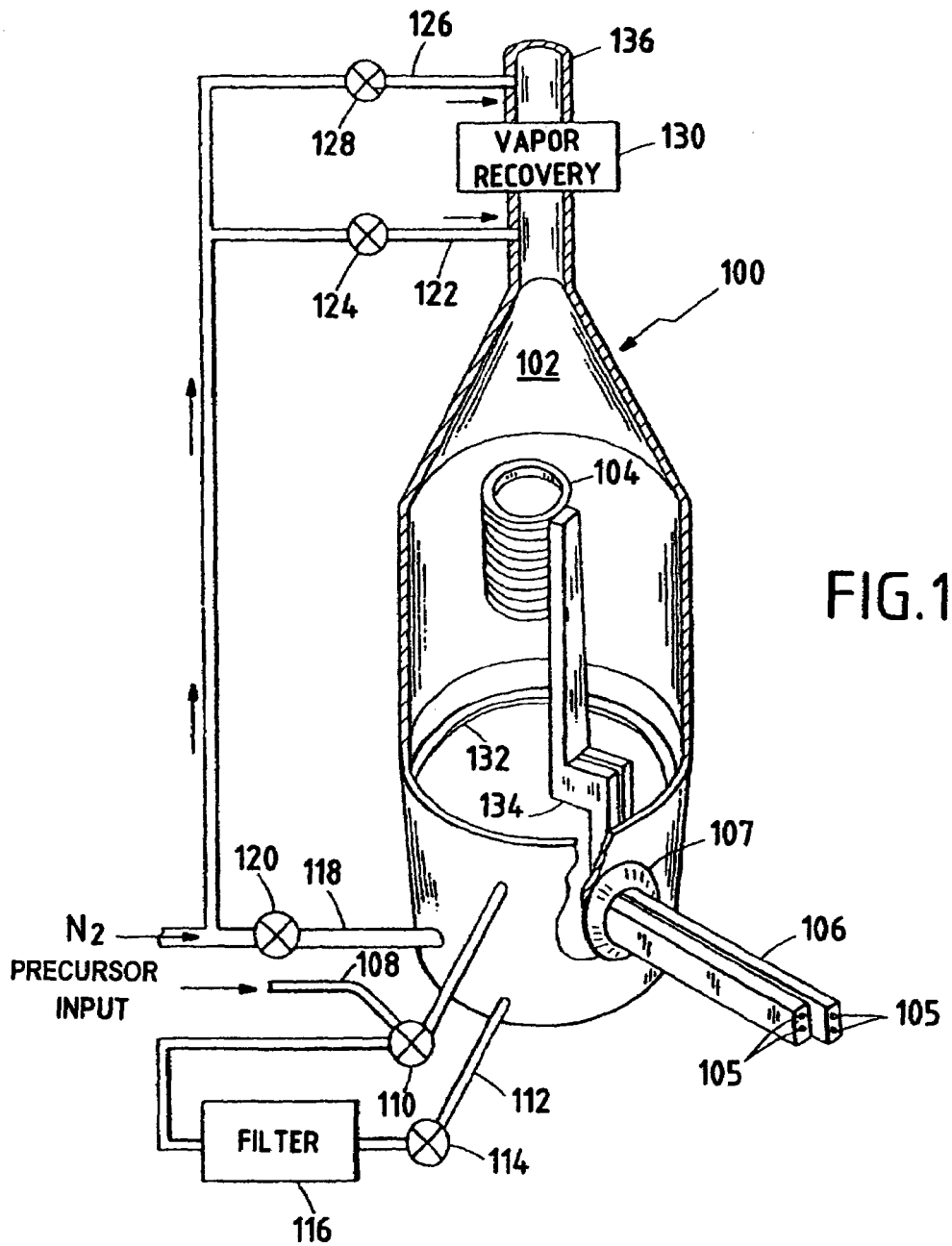
FIG. 1 is a partially-schematic cut-away drawing of a reactor suitable for densifying a ceramic foam by the method of the invention.

The features and other details of the method of the invention will now be more particularly described with reference to the accompanying drawing and pointed out in the claims. It will be understood that the particular embodiments of the invention are shown by way of illustration and not as limitations of the invention. The principal features of this invention can be employed in various embodiments without departing from the scope of the invention.

In a method of this invention, a densified composite foam is formed by depositing a coating on an open-cell reticulated foam skeleton.

In one embodiment of the method, the foam skeleton comprises carbon in the form of an open lattice of ligaments, wherein the interconnected pores defined by the lattice have diameters of about 0.5 to about 1.0 mm. The lattice has a micrographic porosity of about 100 pores per inch, a bulk density of about 0.04 g/cm$^3$, and a surface area of about 1.6 m$^2$/g. In an alternate embodiment, the lattice has a micrographic porosity of about 60 pores per inch. The foam skeleton is formed by pyrolyzing a polymeric foam. The polymeric foam is formed from a thermosetting polymer foam preform of for example, a polyurethane, phenolic or polyimide. The polymer foam is in the form of an open lattice of ligaments forming a network of three-dimensionally interconnected cells. In comparison to carbon fibers, the polymer foam is relatively easy to shape into the desired form.

The polymer foam is liquid infiltrated with a carbon-bearing resin and pyrolized at approximately 600° C. to 1200° C. in a vacuum or in an inert or reducing atmosphere to form an all-carbon reticulated foam skeleton. The carbon foam skeleton has an essentially amorphous structure in the form of the polymer foam preform. As an alternative to pyrolizing a polymer foam to form the carbon foam skeleton, the carbon foam skeleton can be purchased commercially from Ultramet (Pacoima, Calif., USA) or from Vitre-Cell, Inc. (Essexville, Mich., USA).

As an alternative to the amorphous carbon skeletons, described above, a crystalline foam skeleton can also be used. For example, a microcellular graphitic foam is formed by pyrolysis and graphitization of thermoplastic carbon-fiber precursor materials such as polyacrylonitrile (PAN) or mesophase pitch. The foaming process aligns the graphitic planes along each ligament axis, resulting in higher strength and stiffness. These foams may be available from, for example, Wright Materials Research Co. (Dayton, Ohio, USA).

The carbon skeleton is then coated, in this embodiment, with pyrolytic carbon or graphite to increase the density of the foam and to increase its strength to thereby make it suitable for use, for example, in wet friction applications. In one specific method, the carbon skeleton is coated with pyrolytic carbon via a process known as "rapid densification." In this example, the carbon skeleton is immersed in a liquid precursor and heated. The heat of the carbon skeleton pyrolizes the liquid precursor, thereby generating gaseous products which deposit carbon on the skeleton upon contact to form a coating. The specifics of the rapid densification process and the equipment used to perform it will now be described in greater detail and with reference to FIG. 1, below.

An example of apparatus suitable for practicing the method of the invention is shown in FIG. 1. General descriptions of operation of the apparatus are set forth in U.S. Pat. No. 5,389,152, issued to Thurston et al. on Feb. 14, 1995, the teachings of which are incorporated herein by reference in their entirety, and in U.S. Pat. No. 4,472,454, issued to Houdayer et al. on Sep. 18, 1984, the teachings of which are also incorporated herein by reference in their entirety. Reactor 100 is described in U.S. Pat. No. 5,397,595, issued to Carroll et al. on Mar. 14, 1995 and in U.S. Pat. No. 5,547,717, issued to Scaringella et al. on Aug. 20, 1996. The teachings of both are additionally incorporated herein by reference in their entirety. When an induction coil 104 is used to heat the skeleton, reactor 100 is preferably made from non-magnetic materials, such as aluminum, quartz, glass, stainless steel, ceramic or combinations thereof.

As shown in FIG. 1, reactor 100 defines cavity 102 in which one or more carbon foam skeletons (not shown) are densified to form composite foams in accordance with the methods of this invention. In operation, cavity 102 is filled with a liquid precursor sufficient to at least cover the skeleton. The liquid precursor is a liquid which vaporizes and decomposes within the skeleton to deposit a decomposition product of the precursor at a temperature to which the skeleton can be heated. Depending upon the composition of the liquid precursor, the decomposition product can be carbon, silicon carbide, silicon nitride, or another material. The liquid precursor should also be a dielectric. Preferably, the dielectric constant of the liquid precursor should be above 0.5, more preferably above one, and most preferably above 1.5. To deposit carbon within the foam, a hydrocarbon with an appropriate boiling point, such as cyclohexane, n-hexane or benzene is used. Alternatively, methyltrichlorosilane, dimethyldichlorosilane, methyldichlorosilane or other organosilane or organosilane mixtures are used to deposit silicon carbide. Also, the liquid precursor can be chosen to co-deposit materials. For example, a mixture of silicon carbide and silicon nitride can be deposited using tris-n-methyl amino silane or other silane compound.

One or more induction coils 104 are positioned within cavity 102, and the carbon foam skeleton is submerged in the liquid precursor in close proximity to induction coil 104. In a specific embodiment, the foam skeleton is placed in a support fixture to firmly hold the skeleton at a fixed position in relation to reactor 100 and coil 104. The exact shape of the fixture is adapted to the shape of the skeleton. Such a fixture can be supported in any convenient way, such as on lip 132. Further, the size and shape of coil 104 preferably conform to the size and shape of the carbon skeleton. Induction coil 104 can be formed from copper or other highly conductive material which does not react with the liquid precursor even if heated. In one embodiment, induction coil 104 is a Litzwire coil. In contrast to a standard single-strand coil, a Litzwire coil has an appearance similar to a telephone cable; i.e., a Litzwire coil comprises a bundle of insulated wires wound together to provide more efficient inductive coupling.

Induction coil 104 is connected to busses 106 at connector 134. Connector 134 provides a link in an electrical circuit defined, in part, by busses 106. It also provides a link in the water flow circuit formed by channels 105. In particular embodiments, connector 134 is a block of metal allowing anchoring points for screws (not shown) to hold the base of induction coil 104 to busses 106. The joints in the water flow circuit can be sealed by flexible "O" rings or in some other convenient fashion. The material should be resistant to degradation in both water and the liquid precursor. Viton® fluoroelastomer from E. I. DuPont de Nemours & Co. or silicone rubber can be used for this purpose. Other attachment arrangements, such as slots and grooves or clips, can also be used.

Busses 106 supply electrical energy to induction coil 104 and are made of a highly conductive material, such as copper. Currents on the order of hundreds of amperes to thousands of amperes are preferably used to provide sufficient power to heat the foam. Because of the large amount of current, busses 106 should have sufficient cross sections to avoid excess heating. Busses 106 can contain water passages 105 to carry cooling water through busses 106 and through induction coil 104.

In an alternative embodiment, busses 106 are connected to a heated mandrel, rather than to induction coil 104. The mandrel is then inserted through a foam tube which is to be the subject of rapid densification. The mandrel is formed principally of carbon and may include a release agent, such as boron nitride on its surface. In one embodiment, the mandrel is used as a susceptor and is inductively heated to generate heat which is conducted into the carbon foam. Alternatively, the mandrel is physically coupled with a voltage source and is subject to resistive heating to generate heat to be transferred to the carbon foam. Indeed, the substrate can be heated directly by resistance heating provided that the geometry is conducive to uniform heating.

Busses 106 enter the chamber through a silicone rubber seal 107. Busses 106 are connected to an AC power supply (not shown). The voltage, current, frequency and shape of induction coil 104 are determined by the shape, geometry and the electrical properties of the foam using known techniques.

As will be explained more fully, below, the rapid densification process, described herein, heats the foam to higher temperatures at its center than at its periphery. Typically, the initial power provided by the AC power supply is at a level that inductively heats the foam to generate a temperature at the center of the foam that is high enough to pyrolize the precursor and deposit a decomposition product, without heating more peripheral regions beyond relatively-low temperatures at which deposition is limited. In contrast, if the power, and the consequent rate of deposition, is too high, the interior of the foam can be sealed off by the deposition and build-up of decomposition product in peripheral areas, thereby resulting in non-uniform densification. Accordingly, the current level, in specific embodiments of this method, is on the order of thousands of amperes, though the precise level will depend on the foam's cross-sectional area. At the densification center, which is not necessarily, but is typically, at the center of the foam, the temperature is typically in the range of between about 850° C. and about 2,000° C. The preferred temperature is in the range of between about 850° C. and about 1,000° C.

The dynamics of deposition by way of the above-described method differs significantly from that of CVD. Whereas CVD deposits a decomposition product throughout the preform during densification, the above-described method results in a densification profile that typically begins at the center of the preform and progresses to the surfaces. It is believed that this profile exists because the liquid precursor, and the boiling thereof, acts to cool the exterior of the foam, thereby creating a temperature gradient through the foam's thickness. Accordingly, the temperature gradient is such that the densification center of the foam is hotter than the surface. Because the rate of deposition increases with increasing temperature, densification proceeds from the center to the surface as the temperature of the foam is increased. Further, as deposition of the decomposition product proceeds, the conductivity of the foam increases, improving the coupling with the electric field. Consequently, less current is needed to heat the foam, and the foam can be processed using a modified heating cycle in which the final power is decreased by about twenty-five percent from the power required to densify out to the edges of the foam.

Returning to FIG. 1, the liquid precursor that is to be pyrolized and deposited within the foam is supplied to reactor 100 through precursor input 108 via valve 110. Initially, chamber 102 is filled with a liquid precursor of sufficient quantity to cover the foam. In operation, the liquid precursor can be consumed in the deposition reaction or can escape from reactor 100 as vapor. Accordingly, precursor input 108 can be utilized during operation of reactor 100 to replace liquid precursor which is dissipated.

During densification, the liquid precursor can become clouded. In that case, valve 114 is opened to allow liquid precursor to flow through reactor 100 and return 112 to filter 116 where it is filtered and pumped back into reactor 100. Filter 116 can be any suitable filter, such as a porous ceramic screen or, more preferably, charcoal. Alternatively, the liquid precursor is removed from reactor 100 and is then distilled after one or more densification cycles once the liquid precursor becomes clouded.

The liquid precursors, as used herein, are potentially flammable. Accordingly, the densification operation is preferably performed in an inert atmosphere. For example, nitrogen gas can be used. To purge chamber 102 of air, valve 120 is opened to allow an inert gas, such as nitrogen, to flow through input 118. Valve 124 can be opened to more rapidly and effectively purge vapor recovery system 130. Once the atmosphere in chamber 102 is replaced by an inert gas, such as nitrogen gas, valve 128 can be opened to provide nitrogen directly into vent stack 136. This flow of nitrogen prevents air from reaching chamber 102 and valves 120 and 124 can be closed. Closing valves 120 and 124 reduces the flow of gas through vapor recovery system 130. Vapor recovery system 130 can therefore operate more efficiently.

Vapor recovery system 130 is a system of the type known in the art for recovering vaporized liquids. Such a system reduces the amount of waste generated in the process and the amount of precursor used. Further, vapor recovery system 130 prevents the loss of a significant volume of the liquid precursor due to vaporization.

Specific embodiments of the method of this invention include the additional step of performing CVD prior to rapid densification to preliminarily increase the density of the foam and to increase the initial rate of densification during the rapid densification process.

In another optional step, CVD can be performed after a composite foam has been densified by the above-described methods. In some circumstances, the above described methods can produce a foam that has a greater density at its interior than at its periphery. In these situations, CVD can then be used to complete densification and to provide the foam with a more uniform density by preferentially building the deposited coating near the surface of the foam.

In regard to the product of this invention, a carbon foam of this invention includes an open lattice of carbon ligaments forming a network of three-dimensional interconnected cells. The open lattice is coated with a crystallized carbon coating to produce a foam with a solid density greater than 30%.

In specific embodiments, the carbon/carbon foam composite of this invention is formed by the above-disclosed methods. Its structure is essentially isotropic, at least on a macroscopic scale. When designed for wet friction applications, the composite structure preferably has a solid density of at least about 40%. Further, for some applications, the composite structure is subjected to rapid densification until a solid density of at least about 50% is obtained. Further still, with extended densification, openly-porous foam structures of 67%, 76% and 82% density have been obtained. The porosity can be controlled by varying the pore size and/or distribution of the polymer foam preform or by varying the deposition conditions. In specific embodiments, the composite foam defines a structure of interconnecting pores that allow hydraulic fluid to flow through the foam.

Figure 2:
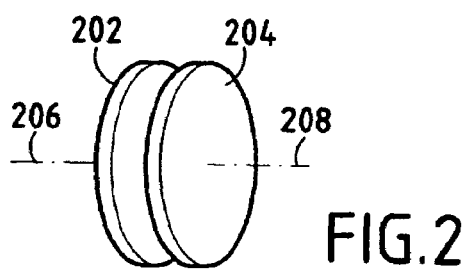
FIG. 2 is an illustration of a clutch or brake configuration typical in the art having ceramic foam clutch or brake components according to the invention.

Accordingly, the foam can be cast in an appropriate shape and sufficiently densified to form a composite for use as a wet-friction material in a clutch or brake, e.g., in an automobile, where the composites are mounted opposite one another for relative rotation and frictional engagement, as illustrated in FIG. 2.

FIG. 2 illustrates a well-known application for the composite foam of the invention in which first and second brake or clutch members 202, 204, are mounted, 206, 208, for relative rotation. The members 202, 204 have friction material as described above rotatable therewith on confronting surfaces thereof.

Moreover, fully or nearly-fully dense structures can be formed for use in structural applications such as aircraft brakes, automobile pistons, missile nose cones, susceptor/crucible cradles for crystal pulling, and low-coefficient-of-thermal expansion space structures.

In additional embodiments, the composite foam is subjected to post-densification treatments, including surface coatings for improved oxidation resistance, resin infiltration, or localized hardening by filling (e.g., by painting or wicking) pores with various matrix materials. The surfaces of partially-densified foam can also be sealed over by spiking the temperatures at the end of RD processing to yield stiff, lightweight, porous structures having solid surfaces.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An improved clutch or brake device in which at least two members are mounted for relative rotation and engagement, the members having friction material rotatable therewith, and the friction material of the members having surfaces confronting each other, characterized in that the friction material has a solid density of greater than 30% and includes:
    a) an open lattice of carbon ligaments forming a network of three dimensionally interconnected cells; and
    b) a pyrolytic carbon coating on the open lattice of carbon ligaments.

2. The improved clutch or brake device of claim 1, wherein the friction material defines a structure of interconnecting pores that allow hydraulic fluid to flow through the friction material.

3. The improved clutch or brake device of claim 2, wherein the friction material has an essentially isotropic structure.

4. The improved clutch or brake device of claim 1, wherein the open lattice of carbon ligaments consists essentially of amorphous carbon.

* * * * *